United States Patent
Waldner

(10) Patent No.: US 9,445,574 B2
(45) Date of Patent: Sep. 20, 2016

(54) ATTIC INLET

(71) Applicant: John Waldner, MacGregor (CA)

(72) Inventor: John Waldner, MacGregor (CA)

( * ) Notice: Subject to any disclaimer, the term of this patent is extended or adjusted under 35 U.S.C. 154(b) by 435 days.

(21) Appl. No.: 13/694,933

(22) Filed: Jan. 22, 2013

(65) Prior Publication Data

US 2013/0273827 A1 Oct. 17, 2013

Related U.S. Application Data

(63) Continuation-in-part of application No. 12/929,265, filed on Jan. 12, 2011, now abandoned.

(51) Int. Cl.
*A01K 1/00* (2006.01)
*F24F 13/14* (2006.01)
*F24F 13/16* (2006.01)

(52) U.S. Cl.
CPC ........... *A01K 1/0058* (2013.01); *A01K 1/0047* (2013.01); *F24F 13/1426* (2013.01); *F24F 13/16* (2013.01)

(58) Field of Classification Search
CPC ... A01K 1/0058; A01K 1/0047; F24F 13/16; F24F 13/1426
USPC ....... 454/260, 270, 299, 300, 347, 348, 354, 454/355, 358, 360, 362
See application file for complete search history.

(56) References Cited

U.S. PATENT DOCUMENTS

| 719,203 | A | * | 1/1903 | Dreyer | 454/199 |
|---|---|---|---|---|---|
| 985,148 | A | * | 2/1911 | Cumings | 454/362 |
| 1,601,191 | A | * | 9/1926 | Simmons | 454/358 |
| 1,838,878 | A | * | 12/1931 | Stoddard | 49/96 |
| 2,278,581 | A | * | 4/1942 | Dexter | 454/354 |
| 2,328,659 | A | * | 9/1943 | McKenna | 454/358 |
| 2,611,608 | A | * | 9/1952 | Braskamp | 49/347 |
| 2,734,710 | A | * | 2/1956 | Noble | 248/487 |
| 2,810,334 | A | * | 10/1957 | Perks et al. | 454/95 |
| 2,856,835 | A | * | 10/1958 | Horne | 454/364 |
| 3,122,982 | A | * | 3/1964 | Eggert, Jr et al. | 454/136 |
| 3,392,658 | A | * | 7/1968 | Korff | 454/362 |
| 3,537,379 | A | * | 11/1970 | Kaneko et al. | 454/275 |
| 3,733,750 | A | * | 5/1973 | Hege | 49/379 |
| 4,736,641 | A | * | 4/1988 | Reid | 74/103 |
| 6,068,551 | A | * | 5/2000 | Oremland | 454/165 |
| 6,475,078 | B1 | * | 11/2002 | Borcherding | 454/259 |
| 8,827,781 | B2 | * | 9/2014 | Aderman | 454/254 |
| 2012/0178356 | A1 | * | 7/2012 | Waldner | 454/260 |

FOREIGN PATENT DOCUMENTS

CA 2763969 7/2012

* cited by examiner

*Primary Examiner* — Steven B McAllister
*Assistant Examiner* — Frances F Hamilton

(57) ABSTRACT

An attic inlet has a square tube to communicate between an attic and a room through a substrate, with a lid permitting airflow when open, and not when closed. The lid is moved by upper pull bars and lower connecting bars attached to the lid. Upper pull bars and lower connecting bars are attached by pivot pins to yoke arms pivoting about parallel axles. Springs may urge the lid into closed default position. An axle with an associated stub arm may be rotated by cord to open the lid. Alternatively a counterweighted arm may urge the lid into closed default position, where negative pressure can open the lid. The lid is attached by tabs on the connecting bars passing through the lid, and lid locking bars engaging apertures in the tabs.

20 Claims, 6 Drawing Sheets

ATTIC INLET

CROSS REFERENCE TO RELATED APPLICATIONS

This application is a Continuation-in-Part of and claims priority to and the benefits of U.S. patent application Ser. No. 12/929,265 filed 12 Jan. 2011, entitled "Attic Inlet", the contents of this application are hereby incorporated by reference.

FIELD OF INVENTION

This invention is directed to an attic inlet for ventilating a livestock barn, typically for hogs or poultry, although it is not restricted to particular livestock.

BACKGROUND AND PRIOR ART

Ventilation is important in livestock barns in general and hog barns in particular. Attic inlets allow air to exchange between the attic space of a barn above a ceiling, usually to provide an intermediate temperature acting as a buffer, between the barn interior and the outside.

Attic inlets are generally rectangular housings with a lid or lids which can be closed preventing air interchange between attic and barn interior or open allowing air interchange. Typically there are a plurality of inlets with lids all controlled from a central point, which open together to the same extent. The inlet housing is typically a short rectangular or square tube set in the barn ceiling, with a lid or lids which can be opened. In one form there is a fixed panel transverse to the tube, and louvers set in opposed sides of the tube, sometimes all four sides.

Canadian Patent Application 2,763,969 and US Patent Application Publication 20120178356 both published 12 Jul. 2012 to applicant, teach a rectangular inlet, differing from instant invention, where the lid is moved by an upper pull bar and lower connecting bars attached to the lid. Upper pull bar and lower connecting bars are attached by clevis pins to yoke arms pivoting about parallel axles. Movement of the upper pull bar rotates the yoke arms, and so lowers the connecting bars and the attached lid. Springs urge pull bar and lid into closed default position, while a cord is used to displace pull bar and lid into open position. The lid is attached by tabs on the connecting bars passing through the lid, and lid locking bars engaging apertures in the tabs.

U.S. Pat. No. 6,475,078, to Borcherding, 5 Nov. 2002, teaches such a device, which has counterweighted louvers which are opened by air pressure to provide air exchange, a shutoff louver is also provided. In another form the lid(s) are transverse to the tube axis. A single lid may be hinged or pivoted on one side, in which case it is lowered to open position to allow air exchange. Double lids may be pivoted centrally and lowered to provide air exchange, alternatively they may be pivoted at their outer edges and lowered to provide air exchange. In another form the lid may be lowered horizontally to provide air exchange.

A particular one lid four way inlet, is the counterweighted Eagan Sturdy Seal, for which, although extensively advertised, no clear diagram, picture or photograph is available. The lid is lowered horizontally by a scissors frame arrangement, the counterweight urges the lid closed, while the cable, cord, string, wire, or the like moves the counterweight allowing the lid to open. This has the advantage over other systems that the counterweight is used to hold the lid closed, while the cable, cord, string, wire or the like, opens the lid, when pulled by a machine. In most inlets the machine pulls the lid closed, as the strings stretch, unless the inlet strings are perfectly adjusted, individual inlets may stay open.

Typically the lid is controlled by a cable, cord, string, wire or the like, which may open the lid or close the lid, the default position is closed. Counterweights or springs can be used to either urge the lid closed or open. Lids may have manual shutoffs as well. In general since the ventilation is effected by fans, the lids default position is shut when the fans are off. Cables, cords, strings, wires and the like stretch in use, so springs or counterweights are preferably used to keep the lid(s) shut when not in use. The cable, cord, string or wire and the like is then used to open the lid(s) against counterweight or spring. It is preferred that the cable, cord, string, wire and the like be machine controlled, and more preferably that one machine control all the air inlet lids in a building, so that they can be actuated together.

DESCRIPTION OF THE INVENTION

The invention in one broad embodiment is directed to an air inlet for ventilation comprising an upper aperture and a lower aperture joined by a tubular passage defined by surrounding side walls extending between the apertures. The upper aperture has a generally planar edge and is adapted to allow airflow from a corresponding aperture in a substrate. The lower aperture has a planar edge generally parallel to the edge of the upper aperture and is locatable below the substrate. The lower aperture has a lid movable between a closed position blocking the passage, and at least one open position allowing air flow through the passage. The tubular passage is generally rectangular in cross section. It has side walls forming two pairs of opposed parallel walls connected at their side edges. There are spaced apart parallel first and second axles extending between one pair of opposed parallel side walls, each axle has two yokes mounted thereon adjacent the side walls. The yokes have first and second arms extending outward at an angle, which may be acute, a right angle or obtuse, with acute preferred. There are two upper pull bars, preferably metal, substantially parallel to a plane formed by the axles, and the pull bars are joined to the yokes by first pivot pins, preferably clevis pins, journalled in the pull bars and the first arms of the yokes. Two lower connecting bars, preferably plastic, are aligned substantially perpendicular to the axles. The connecting bars are joined to the yokes by second pivot pins, preferably clevis pins, journalled in the connecting bars and the second arms of the yokes. The yokes and pivot pins hold the pull bars and connecting bars in firm relationship with each other. The lower connecting bars are attached to the lid. Although the two pull and connecting bars are independent of each other, one or more connecting cross struts could be used to join them together. The pull bars have a default position wherein the lid is in closed position. The yokes are rotatable from the default position where the arms are generally upward and the pivot pins aligned parallel to the edges of the upper and lower apertures. When the pull bars are displaced from their default position away from the first axle toward the second axle the yokes are angularly rotated away from the default position so the first arms are closer to the edge of the upper aperture and the second arms are closer to the edge of the lower aperture, whereby the lower connecting bars are displaced away from the edge of the upper aperture, and the lid is displaced away from the edge of the lower aperture into an open position, the angle of rotation of the yokes determining the displacement of the lid. Preferably the axles have square end sleeves, which matingly engage square apertures in the yokes. Preferably the first axle has a square cross section. This keeps the yokes on the first axle in fixed relation to the first axle and hence the pull bars and the yokes on the second axle move together with the first axle. The connecting bars move with their associated pivot pins together with the first axle. Preferably the upper aperture's generally planar edge has a surrounding planar lip extending generally perpendicular to the side walls. The lip is adapted to fit against a substrate. Generally holes are drilled through the lip at installation and it is secured to the substrate by screws or bolts, staples, or adhesive may also be used. Preferably the lower connecting bars extend downward to the lid and are attached thereto. Preferably the connecting bars have end projections extending the same distance downward. The projections have downward tabs at their bottom. These downward tabs have therein apertures, which are substantially at right angles to the connecting bars. Preferably the lid has four apertures to register with the tabs of the connecting bars. When registered the tabs pass through the lid. Preferably there are paired lid locking bars on the lower surface of the lid parallel to the axles engaging the apertures of the tabs of the connecting bars at both ends, and holding the lid in fixed relation to the connecting bars. The lid locking bars are flexible and can be removed together with the lid. Typically this is done at installation so that holes can be drilled through the lip to attach the inlet to the substrate, or to check and repair the interior of the installed inlet. Preferably each lid locking bar has a central tab to engage a recess in the lower surface of the lid, which also hold the lid locking bar in position preventing it sliding out. Preferably each lid locking bar has central wings extending perpendicular to the lid locking bar on either side. These wings are present to prevent the lid locking bars when removed to take off the lid from dropping between floor slats in a hog barn. When this occurs the lid locking bar has to be extracted from under the floor. The wings prevent this occurrence.

Preferably paired springs are attached to a first cross wall adjacent the first axle, and each spring is attached to one upper pull bar adjacent the first axle. The springs urge the pull bars into the default position and the lid closed. The first axle protrudes through one opposed parallel side wall and has an arm attached thereto, the arm having therein an aperture adapted to receive a cord whereby the first axle may be rotated urging the pull bars away from the default position opening the lid. The cord may be attached by other cords to a machine so an array of inlets my be opened together. The term cord as used herein is meant to cover cords, wires, cables, strings, and the like, as understood by those skilled in the art.

Alternatively when the first axle protrudes through one opposed parallel side wall and has an arm attached thereto, the arm bears a counterweight. This counterweight rotates the first axle urging the pull bars toward the default position and the lid closed, whereby sufficient negative pressure below the lid causes the lid to open.

The invention in a second broad embodiment is directed to an improved air inlet for ventilation comprising an upper aperture and a lower aperture joined by a tubular passage defined by surrounding side walls extending between the apertures. The upper aperture has a generally planar edge and is adapted to allow airflow from a corresponding aperture in a substrate. The lower aperture has a planar edge generally parallel to the edge of the upper aperture and is locatable below the substrate. The lower aperture has a lid movable between a closed position blocking the passage, and at least one open position allowing air flow through the passage. The tubular passage is generally rectangular in cross section. It has side walls forming two pairs of opposed parallel walls connected at their side edges. The improvement comprises spaced apart parallel first and second axles extending between one pair of opposed parallel side walls, each axle has two yokes mounted thereon adjacent the side walls. The yokes have first and second arms extending outward at an angle, which may be acute, a right angle or obtuse, with acute preferred. There are two upper pull bars, preferably metal, substantially parallel to a plane formed by the axles, and the pull bars are joined to the yokes by first pivot pins, preferably clevis pins, journalled in the pull bars and the first arms of the yokes. Two lower connecting bars, preferably plastic, are aligned substantially perpendicular to the axles. The connecting bars are joined to the yokes by second pivot pins, preferably clevis pins, journalled in the connecting bars and the second arms of the yokes. The yokes and pivot pins hold the pull bars and connecting bars in firm relationship with each other. The lower connecting bars are attached to the lid. Although the two pull and connecting bars are independent of each other, one or more connecting cross struts could be used to join them together. The pull bars have a default position wherein the lid is in closed position. The yokes are rotatable from the default position where the arms are generally upward and the pivot pins aligned parallel to the edges of the upper and lower apertures. When the pull bars are displaced from their default position away from the first axle toward the second axle the yokes are angularly rotated away from the default position so the first arms are closer to the edge of the upper aperture and the second arms are closer to the edge of the lower aperture, whereby the lower connecting bars are displaced away from the edge of the upper aperture, and the lid is displaced away from the edge of the lower aperture into an open position, the angle of rotation of the yokes determining the displacement of the lid. Preferably the axles have square end sleeves, which matingly engage square apertures in the yokes. Preferably the first axle has a square cross section. This keeps the yokes on the first axle in fixed relation to the first axle and hence the pull bars and the yokes on the second axle move together with the first axle. The connecting bars move with their associated pivot pins together with the first axle. Preferably the upper aperture's generally planar edge has a surrounding planar lip extending generally perpendicular to the side walls. The lip is adapted to fit against a substrate. Generally holes are drilled through the lip at installation and it is secured to the substrate by screws or bolts, staples, or adhesive may also be used. Preferably the lower connecting bars extend downward to the lid and are attached thereto. Preferably the connecting bars have end projections extending the same distance downward. The projections have downward tabs at their bottom. These downward tabs have therein apertures, which are substantially at right angles to the connecting bars. Preferably the lid has four apertures to register with the tabs of the connecting bars. When registered the tabs pass through the lid. Preferably there are paired lid locking bars on the lower surface of the lid parallel to the axles engaging the apertures of the tabs of the connecting bars at both ends, and holding the lid in fixed relation to the connecting bars. The lid locking bars are flexible and can be removed together with the lid. Typically this is done at installation so that holes can be drilled through the lip to attach the inlet to the substrate, or to check and repair the interior of the installed inlet. Preferably each lid locking bar has a central tab to engage a recess in the lower surface of the lid, which also hold the lid locking bar in position preventing it sliding out. Preferably each lid locking bar has central wings extending perpendicular to the lid locking bar on either side. These wings are present to prevent the lid locking bars when removed to take off the lid from dropping between floor slats in a hog barn. When this occurs the lid locking bar has to be extracted from under the floor. The wings prevent this occurrence.

Preferably paired springs are attached to a first cross wall adjacent the first axle, and each spring is attached to one upper pull bar adjacent the first axle. The springs urge the pull bars into the default position and the lid closed. The first axle protrudes through one opposed parallel side wall and has an arm attached thereto, the arm having therein an aperture adapted to receive a cord whereby the first axle may be rotated urging the pull bars away from the default position opening the lid. The cord may be attached by other cords to a machine so an array of inlets my be opened together. The term cord as used herein is meant to cover cords, wires, cables, strings, and the like, as understood by those skilled in the art.

Alternatively when the first axle protrudes through one opposed parallel side wall and has an arm attached thereto, the arm bears a counterweight. This counterweight rotates the first axle urging the pull bars toward the default position and the lid closed, whereby sufficient negative pressure below the lid causes the lid to open.

The invention in a third broad embodiment is directed to an attic air inlet for ventilation comprising an upper aperture and a lower aperture joined by a tubular passage defined by surrounding side walls extending between the apertures. The upper aperture has a generally planar edge and is adapted to allow airflow from a corresponding aperture in a substrate. The lower aperture has a planar edge generally parallel to the edge of the upper aperture and is locatable below the substrate. The lower aperture has a lid movable between a closed position blocking the passage, and at least one open position allowing air flow through the passage. The tubular passage is generally rectangular in cross section. It has side walls forming two pairs of opposed parallel walls connected at their side edges. There are spaced apart parallel first and second axles extending between one pair of opposed parallel side walls, each axle has two yokes mounted thereon adjacent the side walls. The yokes have first and second arms extending outward at an angle, which may acute, a right angle, or obtuse, with acute preferred. Two upper pull bars, preferably metal, are substantially parallel to a plane formed by the axles, and the pull bars are joined to the yokes by first pivot pins, preferably clevis pins, journalled in the pull bars and the first arms of the yokes. Two lower connecting bars, preferably plastic, are aligned substantially perpendicular to the axles. The connecting bars are joined to the yokes by second pivot pins, preferably clevis pins, journalled in the connecting bars and the second arms of the yokes. The yokes and pivot pins hold the pull bars and connecting bars in firm relationship with each other. The lower connecting bars are attached to the lid. Although the two connecting bars are independent of each other, one or more connecting cross struts could be used to join them together. The pull bars have a default position wherein the lid is in closed position. The yokes are rotatable from the default position where the arms are generally upward and the pivot pins aligned parallel to the edges of the upper and lower apertures. When the pull bars are displaced from its default position away from the first axle toward the second axle the yokes are angularly rotated away from the default position so the first arms are closer to the edge of the upper aperture and the second arms are closer to the edge of the lower aperture, whereby the lower connecting bars are displaced away from the edge of the upper aperture, and the lid is displaced away from the edge of the lower aperture into an open position, the angle of rotation of the yokes determining the displacement of the lid. Preferably the axles have square end sleeves, which matingly engage square apertures in the yokes. Preferably the first axle has a square cross section. This keeps the yokes on the first axle in fixed relation to the first axle and hence the pull bars and the yokes on the second axle move together with the first axle. The connecting bars move with their associated pivot pins together with the first axle. Preferably the upper aperture's generally planar edge has a surrounding planar lip extending generally perpendicular to the side walls. The lip is adapted to fit against a substrate. Generally holes are drilled through the lip at installation and it is secured to the substrate by screws or bolts. Preferably the lower connecting bars extend downward to the lid and are attached thereto.

Preferably paired springs are attached to a first cross wall adjacent the first axle, and each spring is attached to one upper pull bar adjacent the first axle. The springs urge the pull bars into the default position and the lid closed. The first axle protrudes through one opposed parallel side wall and has an arm attached thereto, the arm having therein an aperture adapted to receive a cord whereby the first axle may be rotated urging the pull bars away from the default position opening the lid. The cord may be attached by other cords to a machine so an array of inlets my be opened together. The term cord as used herein is meant to cover cords, wires, cables, strings, and the like, as understood by those skilled in the art.

Alternatively when the first axle protrudes through one opposed parallel side wall and has an arm attached thereto, the arm bears a counterweight. This counterweight rotates the first axle urging the pull bars toward the default position and the lid closed, whereby sufficient negative pressure below the lid causes the lid to open.

Preferably the connecting bars have end projections extending the same distance downward. The projections have downward tabs at their bottom. These downward tabs have therein apertures, which are substantially at right angles to the connecting bars. Preferably the lid has four apertures to register with the tabs of the connecting bars. When registered the tabs pass through the lid. Preferably there are paired lid locking bars on the lower surface of the lid parallel to the axles engaging the apertures of the tabs of the connecting bars at both ends, and holding the lid in fixed relation to the connecting bars. The lid locking bars are flexible and can be removed together with the lid. Typically this is done at installation so that holes can be drilled through the lip to attach the inlet to the substrate, or to check and repair the interior of the installed inlet. Preferably each lid locking bar has a central tab to engage a recess in the lower surface of the lid, which also hold the lid locking bar in position preventing it sliding out. Preferably each lid locking bar has central wings extending perpendicular to the lid locking bar on either side. These wings are present to prevent the lid locking bars when removed to take off the lid from dropping between floor slats in a hog barn. When this occurs the lid locking bar has to be to extracted from under the floor. The wings prevent this occurrence. Preferably the side walls comprise paired opposed cross walls parallel to the axles.

The difference over the prior art is that the four points of contact between the connecting bars and the lid stay in a plane when moved by the pull bar and axles. The lid is displaced the same distance in the same direction at each point, and is always parallel to the plane of the bottom of the tube. Another difference is that the lid is easily and quickly removable and replaceable without tools, no screws, bolts, nuts or other fasteners are involved. The advantage over applicant's own prior art is that the axles protrude from the inlet and may be rotated externally, by counterweight to urge it closed, or by cord to urge it open.

DESCRIPTION OF THE PREFERRED EMBODIMENTS

Figure 1:
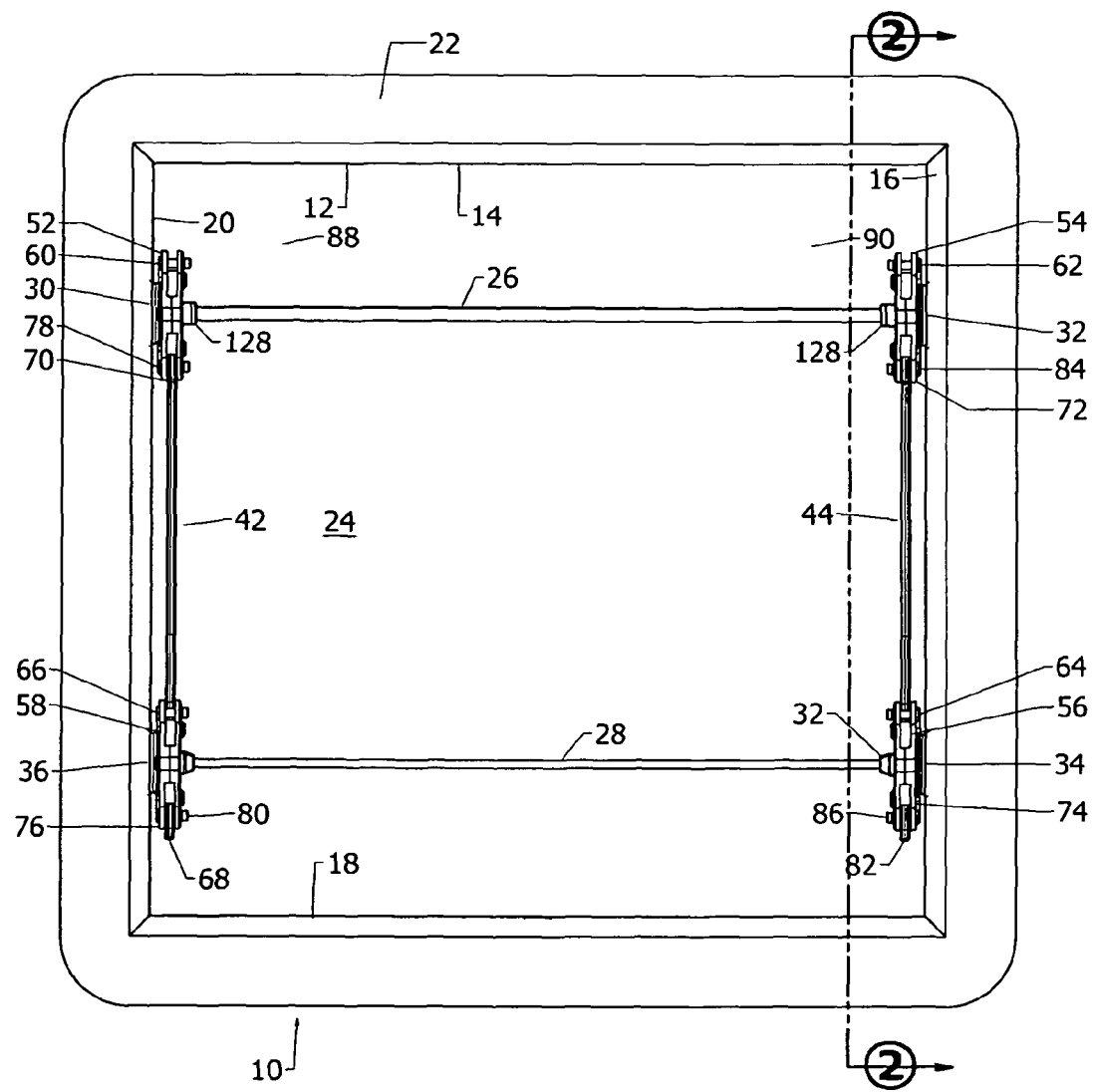
FIG. 1 shows a top plan view of a generic embodiment of the invention in closed position.

The invention is now illustrated by reference to preferred embodiments thereof. Air inlet 10 has rectangular box frame 12 with upright walls 14, 16, 18, and 20, and top mounting lip 22. Box frame 12 is typically hard polyurethane foam 23 inch square and ½ inch thick, with lip 22 extending 2½ inch outward, it is 4½ inch deep. Bottom ventilating lid 24 abuts box frame 12 in closed position, bottom lid 24 is typically foamed plastic, 27 inch square and ⅝ inch thick. Metal rods 26 and 28, extend between walls 16 and 20 in which they are journalled. U yokes 30 and 32, typically of nylon, are rotatably mounted on square metal rod 26, typically aluminum, ⅜ inch square, which has square socket in square base 128 engaging square apertures 130 in yokes 30 and 32. U yokes 34 and 36, also typically nylon, are similarly rotatably mounted on round metal rod 28, typically stainless steel, ¼ inch diameter, which has round socket in square base 132 engaging square aperture 134 in yokes 34 and 36. The ends of rods 26 and 28 are rotatably received in inside bushings (not shown) in walls 16 and 20. Upper pull bars 42 and 44 are typically metal, typically 16 gauge. Pull bar 42 is attached to arms 52 and 58 of U yokes 30 and 36, by clevis pins 60, and 66, while pull bar 44 is attached to arms 54 and 56 of U yokes 32 and 34 by clevis pins 62 and 64, all the clevis pins have push nuts. Lower connecting bar 68, nylon, ¼ inch thick, is attached to arms 70 and 76 of U yokes 30 and 36 by clevis pins 78 and 80, while connecting bar 82, nylon, also ¼ inch thick, is likewise attached to arms 72 and 74 of U yokes 32 and 34 by clevis pins 84 and 86, all the clevis pins have push nuts. Lower connecting bars 68 and 82 are attached to bottom lid 24.

Square metal rod 26 engages square apertures 130 in U yokes 30 and 32 through square bases 128. Round metal rod 28 similarly engages square apertures 134 in U yokes 34 and 36 through square bases 132. Movement of pull bar 40 thus rotates U yoke 32 by arm 54 and U yoke 30 by arm 52 the same angle as it rotates U yoke 34 by arm 56 and U yoke 36 by arm 58. Pull bars and U yokes move the same angle. This ensures that arms 70 and 76 attached to connecting bar 68 and arms 72 and 74 attached to connecting bar 82 have the same angular displacement, thus connecting bars 68 and 82 are displaced the same perpendicular distance. Lid 24 is thus lowered or raised the same amount at attachment points. In default position 24 is closed. Lid 24 is half open when lowered about 1½ inches, when full open it is lowered about 3¾ inches. As appreciated by those skilled in the art this confers significant control over the degree of lid opening.

Figure 2:
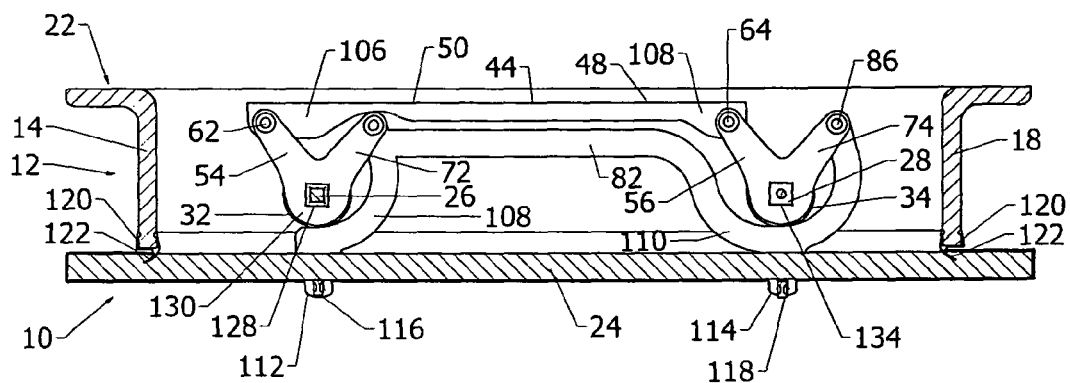
FIG. 2 shows a side cross sectional elevational view of the embodiment of FIG. 1 in closed position.
Figure 3:
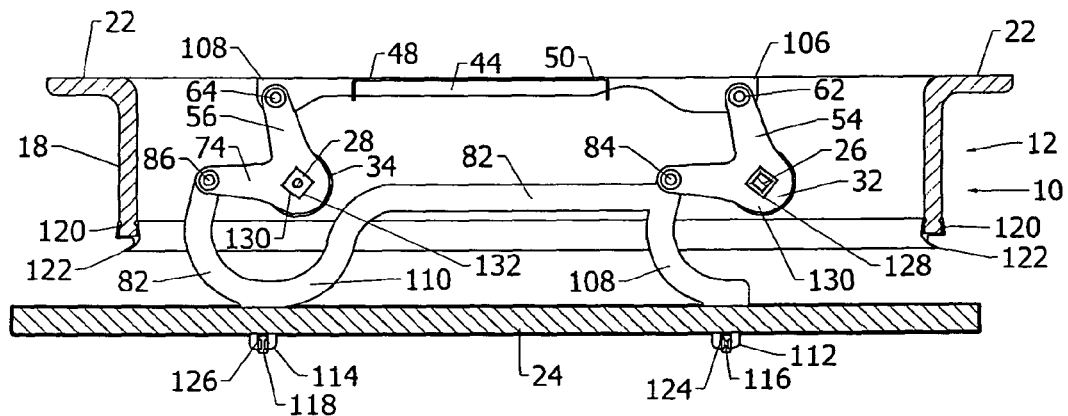
FIG. 3 shows a side cross sectional elevational view of the embodiment of FIG. 1 in open position.
Figure 4:
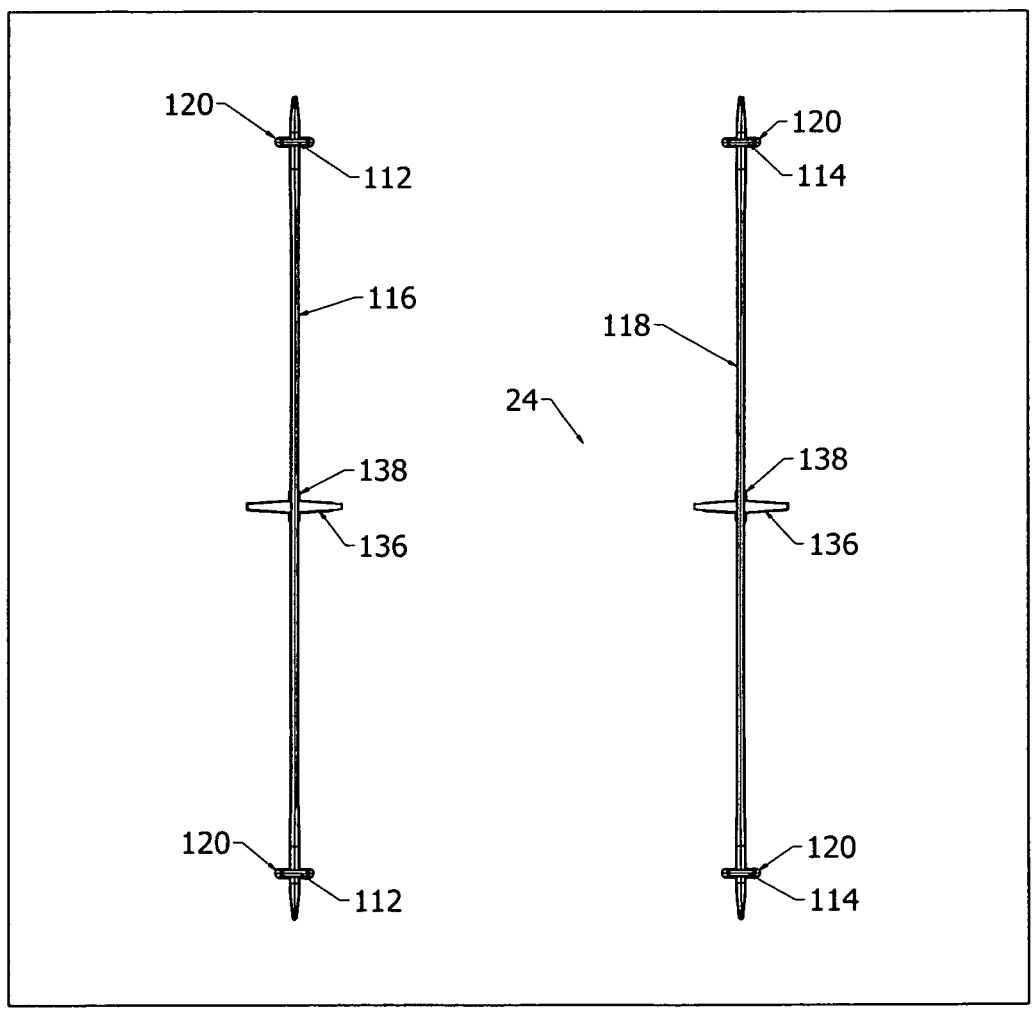
FIG. 4 shows a bottom plan view of the embodiment of FIG. 1.
Figure 5:
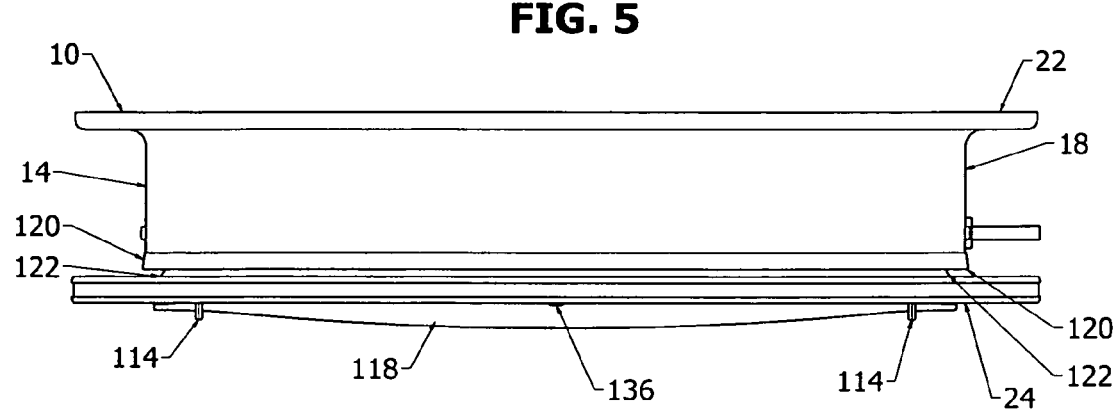
FIG. 5 shows a side elevational view of the embodiment of FIG. 1.
Figure 6:
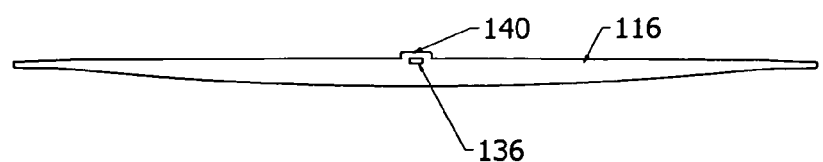
FIG. 6 shows a side elevational view of a lid locking bar of the invention.

Pull bar 44 has downward end flanges 106 and 108 to receive clevis pins 62 and 64. Connecting bar 82 has downward projections 108 and 110, which have projecting tabs 112 and 114 which pass through apertures 120 of bottom lid 24. Tabs 112 and 114 have apertures 124 and 126 which are which are engaged by transverse lid locking bars 116 and 118, which are ¼ inch thick plastic. Tabs 112 and 114 fit snugly into apertures 120 to minimize play. Similarly lid locking bars 116 and 118 fit snugly into apertures 124 and 126 to minimize play. Box frame 12 has attached surrounding plastic bottom flanges 120, fixed to lid 24 by strips 122, which provides an air seal when lid 24 is in contact with box frame 12. FIG. 2 shows the invention in closed (default) position. FIG. 3 shows the invention in open (deployed) position.

Lid 24 is designed for quick attachment, detachment and reattachment. It is made of soft polystyrene insulation foam. Lid locking bars 116 and 118 have optional wings 136 extending at their midpoints some 1½ inches on either side, and tab 140, which engages recess 138 in lid 24. Optional wings 136 when present prevent a dropped lid locking bar falling between floor slats, which are generally present in hog barn floors. Tab 140 snugly engages recess 138 thus preventing lid locking bar 116 or 118 moving out of position. Lid locking bars 116 and 118 are nylon and can be easily removed to take off lid 24, for maintenance, for instance. Lid 24 is also removed to allow screws to be driven through mounting lip 22 into the barn ceiling, securing air inlet 10 to it. Lid 24 is then replaced by pushing it up so tabs 112 and 114 engage slots 120, then the ends of lid locking bars 116 and 118 are pushed through apertures 124 and 126 in tabs 112 and 114, tabs 140 snap into recesses 138 to hold the lid locking bars in place.

Figure 7:
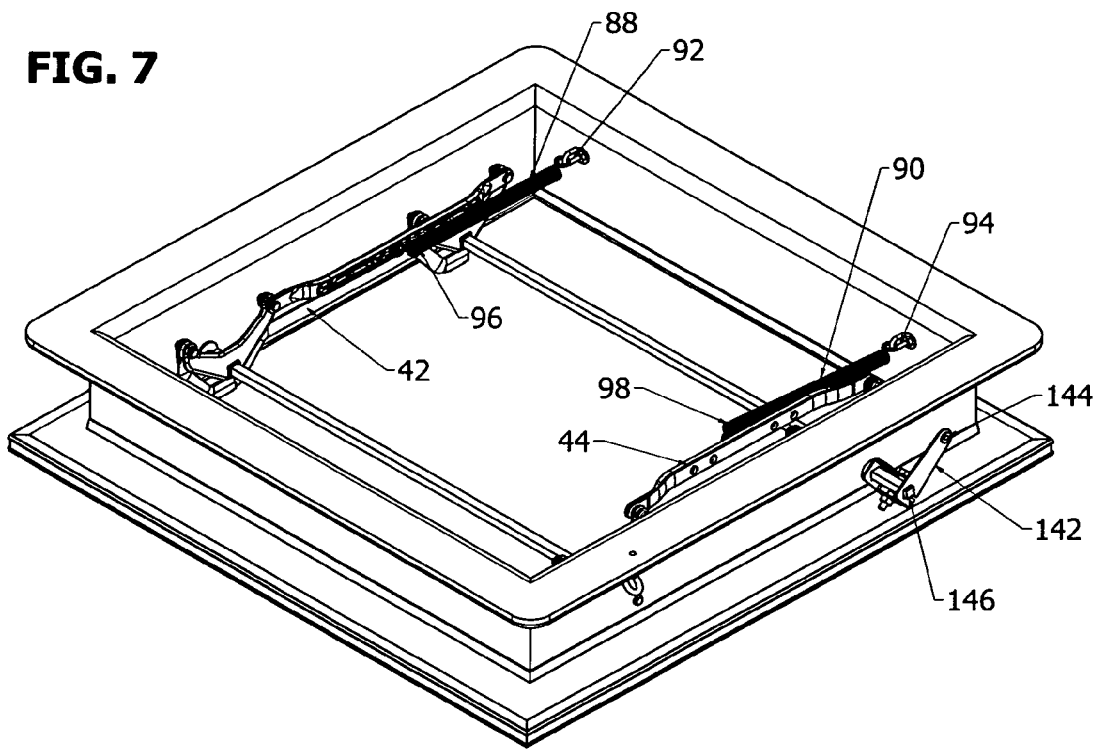
FIG. 7 shows a perspective view of a specific embodiment of the invention.
Figure 8:
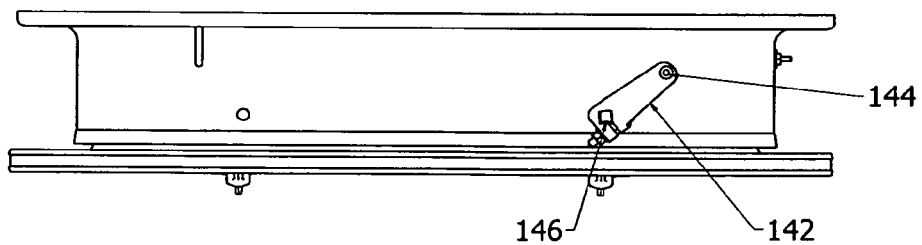
FIG. 8 shows a side elevational view of the embodiment of FIG. 7.

In the embodiment shown in FIGS. 7 and 8 springs 88 and 90, typically stainless steel, are attached to wall 14 by eyebolts 92 and 94 respectively, secured by nuts and washers, their other ends are connected to pull bars 42 and 44 respectively by fasteners 96 and 98, which may be pivot pins, clevis pins or S hooks, springs 88 and 90 urge pull bars 42 and 44 toward wall 14, and keep lid 24 closed. Axle 26 has exterior protrusion 146 which has stub arm 142 mounted upon it, stub arm 142 has aperture 144 adapted to receive a cord or cable, which can be used to rotate stub arm 146 away from wall 14 urging pull bars 42 and 44 toward wall 18 and lid 24 downward and open.

Figure 9:
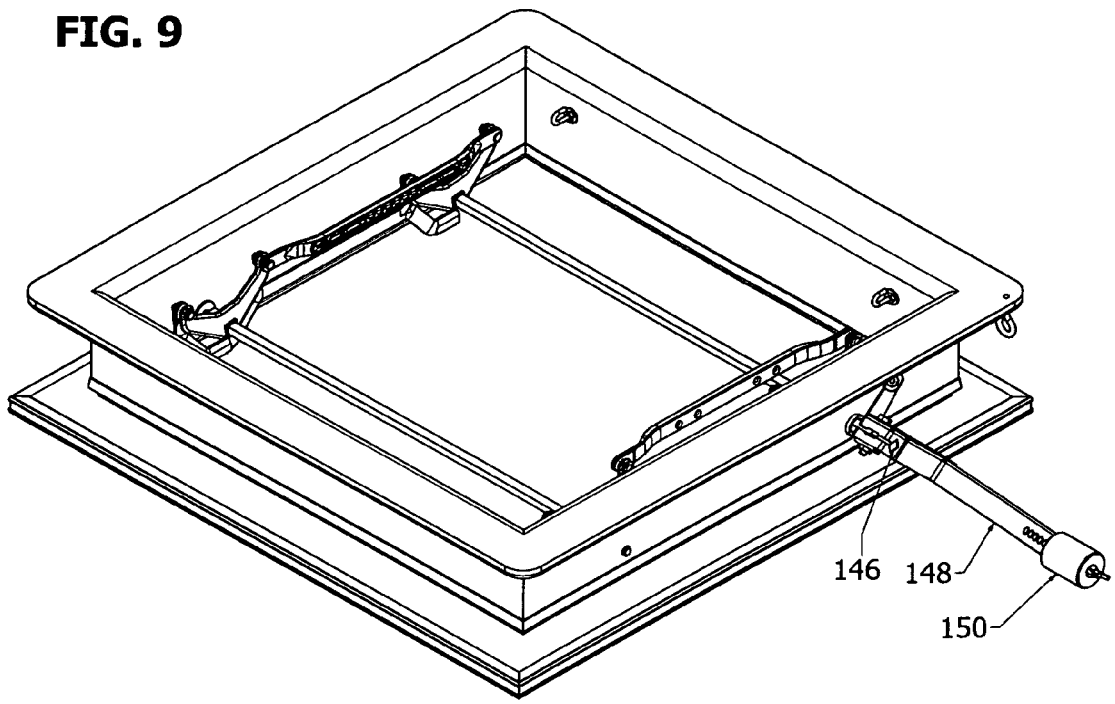
FIG. 9 shows a perspective view of another specific embodiment of the invention.
Figure 10:
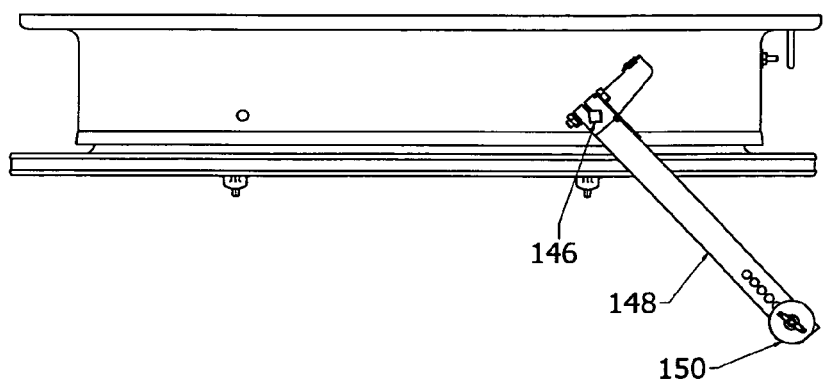
FIG. 10 shows a side elevational view of the embodiment of FIG. 9.

In the embodiment shown in FIGS. 9 and 10 axle 26 has exterior protrusion 146 which has arm 148 mounted upon it, bearing adjustable counterweight 150, which tends to rotate axle 26 toward wall 14, urging pull bars 42 and 44 toward wall 14 and lid 24 closed. In this embodiment lid 24 is opened by negative pressure in the barn, the positive attic pressure pushing lid 24 open allowing air to enter the barn through the inlet.

As those skilled in the art would realize these preferred described details and materials and components can be subjected to substantial variation, modification, change, alteration, and substitution without affecting or modifying the function of the described embodiments.

Although embodiments of the invention have been described above, it is not limited thereto, and it will be apparent to persons skilled in the art that numerous modifications and variations form part of the present invention insofar as they do not depart from the invention as described in the preceding disclosure, appended claims and accompanying drawings.

I claim:

1. Air inlet for ventilation comprising an upper aperture and a lower aperture joined by a tubular passage defined by surrounding side walls extending between said apertures,
    said upper aperture having a generally planar edge and said upper aperture being adapted to allow airflow from a corresponding aperture in a substrate,
    said lower aperture having a planar edge generally parallel to the edge of said upper aperture and locatable below said substrate, said lower aperture having a lid movable between a closed position blocking said passage, and at least one open position allowing air flow through said passage,
    said tubular passage being generally rectangular in cross section,
    said side walls forming two pairs of opposed parallel walls connected at their side edges,
    spaced apart parallel first and second axles extending between one pair of opposed parallel side walls, each axle having two yokes mounted thereon adjacent said side walls, said yokes having first and second arms extending outward at an angle,
    said other pair of said side walls comprising opposed cross walls parallel to said axles,
    two upper pull bars substantially parallel to a plane formed by said axles, and said pull bars being joined to said yokes by first pivot pins journalled in said pull bars and said first arms of said yokes,
    two lower connecting bars aligned substantially perpendicular to said axles, said connecting bars being joined to said yokes by second pivot pins journalled in said connecting bars and said second arms of said yokes,
    said connecting bars being attached to said lid,
    said pull bars having a default position wherein said lid is in closed position,
    said yokes being rotatable from said default position where said arms are generally upward and said pivot pins aligned parallel to said edges of said upper and lower apertures, when said pull bars are displaced from said default position away from said first axle toward said second axle said yokes are angularly rotated away from said default position so said first arms are closer to said edge of said upper aperture and said second arms are closer to the edge of said lower aperture, whereby said lower connecting bars are displaced away from said edge of said upper aperture, and said lid is displaced away from said edge of said lower aperture into an open position, the angle of rotation of said yokes determining the displacement of said lid.

2. Air inlet of claim 1, wherein paired springs are attached to a first cross wall adjacent said first axle, and each spring is attached to one upper pull bar adjacent said first axle, said springs urging said pull bars into said default position and said lid closed, and said first axle protrudes through one opposed parallel side wall and has an arm attached thereto, said arm having therein an aperture adapted to receive a cord whereby said first axle may be rotated urging said pull bars away from said default position opening said lid.

3. Air inlet of claim 1, wherein said first axle protrudes through one opposed parallel side wall and has an arm attached thereto, said arm bearing a counterweight, said counterweight rotating said first axle urging said pull bars toward said default position and said lid closed, whereby sufficient negative pressure below said lid causes said lid to open.

4. Inlet of claim 1, wherein said axles have square end sleeves, which matingly engage square apertures in said yokes.

5. Inlet of claim 4, wherein said first axle has a square cross section.

6. Air inlet of claim 1, wherein said connecting bars have end projections extending the same distance downward, said projections having downward tabs at their bottom, said downward tabs having therein apertures, said apertures being substantially at right angles to said connecting bars
    said lid having four apertures to register with said tabs of said connecting bars, said tabs when registered passing through said lid
    paired lid locking bars on the lower surface of said lid parallel to said axles engaging said apertures of said tabs of said connecting bars at both ends, and holding said lid in fixed relation to said connecting bars.

7. Air inlet of claim 6, wherein each said lid locking bar has a central tab to engage a recess in said lower surface of said lid.

8. Air inlet of claim 7, wherein each said lid locking bar has central wings extending perpendicular to said lid locking bar on either side.

9. Air inlet for ventilation comprising an upper aperture and a lower aperture joined by a tubular passage defined by surrounding side walls extending between said apertures,
    said upper aperture having a generally planar edge and said upper aperture being adapted to allow airflow from a corresponding aperture in a substrate,
    said lower aperture having a planar edge generally parallel to the edge of said upper aperture and locatable below said substrate, said lower aperture having a lid movable between a closed position blocking said passage, and at least one open position allowing air flow through said passage,
    said tubular passage being generally rectangular in cross section,
    said side walls forming two pairs of opposed parallel walls connected at their side edges,
    the improvement comprising spaced apart parallel first and second axles extending between one pair of opposed parallel side walls, each axle having two yokes mounted thereon adjacent said side walls, said yokes having first and second arms extending outward at an angle,
    said other pair of said side walls comprising opposed cross walls parallel to said axles,
    two upper pull bars substantially parallel to a plane formed by said axles, and said pull bars being joined to said yokes by first pivot pins journalled in said pull bars and said first arms of said yokes,
    two lower connecting bars aligned substantially perpendicular to said axles, said connecting bars being joined to said yokes by second pivot pins journalled in said connecting bars and said second arms of said yokes,
    said lower connecting bars being attached to said lid,
    said pull bars having a default position wherein said lid is in closed position, said yokes being rotatable from said default position where said arms are generally upward and said pivot pins aligned parallel to said edges of said upper and lower apertures, when said pull bars are displaced from said default position away from said first axle toward said second axle said yokes are angularly rotated away from said default position so said first arms are closer to said edge of said upper aperture and said second arms are closer to the edge of said lower aperture, whereby said lower connecting bars are displaced away from said edge of said upper aperture, and said lid is displaced away from said edge of said lower aperture into an open position, the angle of rotation of said yokes determining the displacement of said lid.

10. Air inlet of claim 9, wherein paired springs are attached to a first cross wall adjacent said first axle, and each spring is attached to one upper pull bar adjacent said first axle, said springs urging said pull bars into said default position and said lid closed, and said first axle protrudes through one opposed parallel side wall and has an arm attached thereto, said arm having therein an aperture adapted to receive a cord whereby said first axle may be rotated urging said pull bars away from said default position opening said lid.

11. Air inlet of claim 9, wherein said first axle protrudes through one opposed parallel side wall and has an arm attached thereto, said arm bearing a counterweight, said counterweight rotating said first axle urging said pull bars toward said default position and said lid closed, whereby sufficient negative pressure below said lid causes said lid to open.

12. Inlet of claim 9, wherein said axles have square end sleeves, which matingly engage square apertures in said yokes.

13. Inlet of claim 12, wherein said first axle has a square cross section.

14. Air inlet of claim 13, wherein said connecting bars have end projections extending the same distance downward, said projections having downward tabs at their bottom, said downward tabs having therein apertures, said apertures being substantially at right angles to said connecting bars
said lid having four apertures to register with said tabs of said connecting bars, said tabs when registered passing through said lid
paired lid locking bars on the lower surface of said lid parallel to said axles engaging said apertures of said tabs of said connecting bars at both ends, and holding said lid in fixed relation to said connecting bars.

15. Air inlet of claim 14, wherein each said lid locking bar has a central tab to engage a recess in said lower surface of said lid.

16. Air inlet of claim 15, wherein each said lid locking bar has central wings extending perpendicular to said lid locking bar on either side.

17. Attic air inlet for ventilation comprising an upper aperture and a lower aperture joined by a tubular passage defined by surrounding side walls extending between said apertures,
said upper aperture having a generally planar edge and a surrounding planar lip extending generally perpendicular to said side walls, said lip being adapted to fit against a substrate, and said upper aperture being adapted to allow airflow from a corresponding aperture in a substrate,
said lower aperture having a planar edge generally parallel to the edge of said upper aperture and locatable below said substrate, said lower aperture having a lid movable between a closed position blocking said passage, and at least one open position allowing air flow through said passage,
said tubular passage being generally rectangular in cross section,
said side walls forming two pairs of opposed parallel walls connected at their side edges,
spaced apart parallel first and second axles extending between one pair of opposed parallel side walls, each axle having two yokes mounted thereon adjacent said side walls, said yokes having first and second arms extending outward at an angle,
said other pair of said side walls comprising opposed cross walls parallel to said axles,
two upper pull bars substantially parallel to a plane formed by said axles, said pull bars being joined to said yokes by first pivot pins journalled in pull bars and said first arms of said yokes,
said axles having square end sleeves, which matingly engage square apertures in said yokes,
said first axle having a square cross section,
two lower connecting bars aligned substantially perpendicular to said axles, said connecting bars being joined to said yokes by second pivot pins journalled in said connecting bars and said second arms of said yokes,
said lower connecting bars connecting bars extending downward to said lid and being attached thereto,
said pull bars having a default position wherein said lid is in closed position,
said yokes being rotatable from said default position where said arms are generally upward and said pivot pins aligned parallel to said edges of said upper and lower apertures, when said pull bars are displaced from said default position away from said first axle toward said second axle said yokes are angularly rotated away from said default position so said first arms are closer to said edge of said upper aperture and said second arms are closer to the edge of said lower aperture, whereby said lower connecting bars are displaced away from said edge of said upper aperture, and said lid is displaced away from said edge of said lower aperture into an open position, the angle of rotation of said yokes determining the displacement of said lid.

18. Air inlet of claim 17, wherein paired springs are attached to a first cross wall adjacent said first axle, and each spring is attached to one upper pull bar adjacent said first axle, said springs urging said pull bars into said default position and said lid closed, and said first axle protrudes through one opposed parallel side wall and has an arm attached thereto, said arm having therein an aperture adapted to receive a cord whereby said first axle may be rotated urging said pull bars away from said default position opening said lid.

19. Air inlet of claim 17, wherein said first axle protrudes through one opposed parallel side wall and has an arm attached thereto, said arm bearing a counterweight, said counterweight rotating said first axle urging said pull bars toward said default position and said lid closed, whereby sufficient negative pressure below said lid causes said lid to open.

20. Attic air inlet of claim 17, wherein said connecting bars have end projections extending the same distance downward, said projections having downward tabs at their bottom, said downward tabs having therein apertures, said apertures being substantially at right angles to said connecting bars said lid having four apertures to register with said tabs of said connecting bars, said tabs when registered passing through said lid paired lid locking bars on the lower surface of said lid parallel to said axles engaging said apertures of said tabs of said connecting bars at both ends, and holding said lid in fixed relation to said connecting bars, and each said lid locking bar has a central tab to engage a recess in said lower surface of said lid and each said lid locking bar has central wings extending perpendicular to said lid locking bar on either side and said side walls comprise paired opposed cross walls parallel to said axles.

\* \* \* \* \*